(12) United States Patent
Gattu et al.

(10) Patent No.: US 10,235,748 B2
(45) Date of Patent: Mar. 19, 2019

(54) UTILIZING AN IMAGE OF A VALVE ASSEMBLY TO IDENTIFY THE VALVE ASSEMBLY FOUND ON A PROCESS LINE

(71) Applicant: Dresser, Inc., Addison, TX (US)

(72) Inventors: Jagadish Gattu, Southborough, MA (US); Anatoly Podpaly, Sharon, MA (US)

(73) Assignee: Dresser, LLC, Houston, TX (US)

(*) Notice: Subject to any disclaimer, the term of this patent is extended or adjusted under 35 U.S.C. 154(b) by 11 days.

(21) Appl. No.: 15/483,238

(22) Filed: Apr. 10, 2017

(65) Prior Publication Data

US 2017/0213335 A1 Jul. 27, 2017

Related U.S. Application Data

(63) Continuation of application No. 14/641,907, filed on Mar. 9, 2015, now Pat. No. 9,646,371.

(51) Int. Cl.
| | |
|---|---|
| *G06K 9/46* | (2006.01) |
| *G06K 9/78* | (2006.01) |
| *G06T 7/00* | (2017.01) |
| *G06F 17/30* | (2006.01) |

(Continued)

(52) U.S. Cl.
CPC .......... *G06T 7/0004* (2013.01); *G05B 19/048* (2013.01); *G06F 17/30247* (2013.01); *G06K 9/4671* (2013.01); *G06K 9/78* (2013.01); *G05B 2219/24015* (2013.01); *G06F 3/0484* (2013.01);

(Continued)

(58) Field of Classification Search
CPC ............. H04N 2101/00; H04N 1/0097; H04N 1/00148; H04N 1/00145

USPC ............... 382/141, 145, 148, 152, 209, 278; 348/86, 125
See application file for complete search history.

(56) References Cited

U.S. PATENT DOCUMENTS

| | | | |
|---|---|---|---|
| 6,588,505 B2 | 7/2003 | Beck et al. | |
| 6,598,223 B1 * | 7/2003 | Vrhel, Jr. ................ | G06F 8/61 717/168 |

(Continued)

FOREIGN PATENT DOCUMENTS

WO   WO 2011159167 A1   12/2011

OTHER PUBLICATIONS

PCT Search Report and Written Opinion issued in connection with corresponding PCT Application No. PCT/US2016/015880 dated Apr. 26, 2016.

*Primary Examiner* — Yosef Kassa
(74) *Attorney, Agent, or Firm* — Paul Frank + Collins P.C.

(57) ABSTRACT

A system and method for conveying an identity of a valve assembly found on a process line. The method can configure the system for receiving a first image of a subject valve assembly at a first computing device. The method can also configure the system for using the first image, selecting an entry in an asset database, the entry associating valve identifying data that relates to the subject valve assembly with a second image of the subject valve assembly that is stored in the asset database, the valve identifying data configured to define an identity for the subject valve assembly. The method can further configure the system for retrieving data from the selected entry and for generating an output for display on a second computing device, wherein the output is configured to convey the valve identifying data that relates to the subject valve assembly in the first image.

19 Claims, 8 Drawing Sheets

(51) Int. Cl.
  *G05B 19/048* (2006.01)
  *G06F 3/0484* (2013.01)

(52) U.S. Cl.
  CPC .............. *G06T 2200/24* (2013.01); *G06T 2207/30108* (2013.01)

(56) References Cited

U.S. PATENT DOCUMENTS

| | | | |
|---|---|---|---|
| 6,757,006 B1 * | 6/2004 | Yabe | H04N 7/18 348/575 |
| 6,785,805 B1 * | 8/2004 | House | G06Q 10/087 700/90 |
| 6,819,965 B2 * | 11/2004 | Beatty | G06Q 10/06 700/180 |
| 6,961,445 B1 * | 11/2005 | Jensen | G08B 13/194 348/208.15 |
| 6,966,377 B2 | 11/2005 | Johnson et al. | |
| 6,989,764 B2 | 1/2006 | Thomeer et al. | |
| 7,212,953 B1 * | 5/2007 | Artiuch | G01F 1/05 702/100 |
| 7,278,484 B2 | 10/2007 | Vella et al. | |
| 7,458,280 B2 * | 12/2008 | Wehrs | G01F 1/34 73/861.42 |
| 7,596,786 B2 * | 9/2009 | Philyaw | G06Q 30/02 717/174 |
| 7,940,189 B2 * | 5/2011 | Brown | F16K 37/0075 340/605 |
| 8,027,745 B1 * | 9/2011 | Freeze | G06Q 10/06 700/106 |
| 8,364,742 B2 | 1/2013 | Citrano | |
| 8,370,045 B2 | 2/2013 | Qiu et al. | |
| 8,639,464 B2 * | 1/2014 | Artiuch | G01F 25/0053 702/100 |
| 8,684,084 B2 | 4/2014 | Wesson et al. | |
| 8,766,794 B2 | 7/2014 | Ferguson et al. | |
| 8,773,467 B2 | 7/2014 | Chen-Quee et al. | |
| 8,867,819 B2 | 10/2014 | Calio et al. | |
| 8,898,158 B2 | 12/2014 | Martin et al. | |
| 2002/0191002 A1 | 12/2002 | Friedrich et al. | |
| 2009/0198464 A1 | 8/2009 | Clarke et al. | |
| 2014/0344238 A1 | 11/2014 | Rathus et al. | |

* cited by examiner

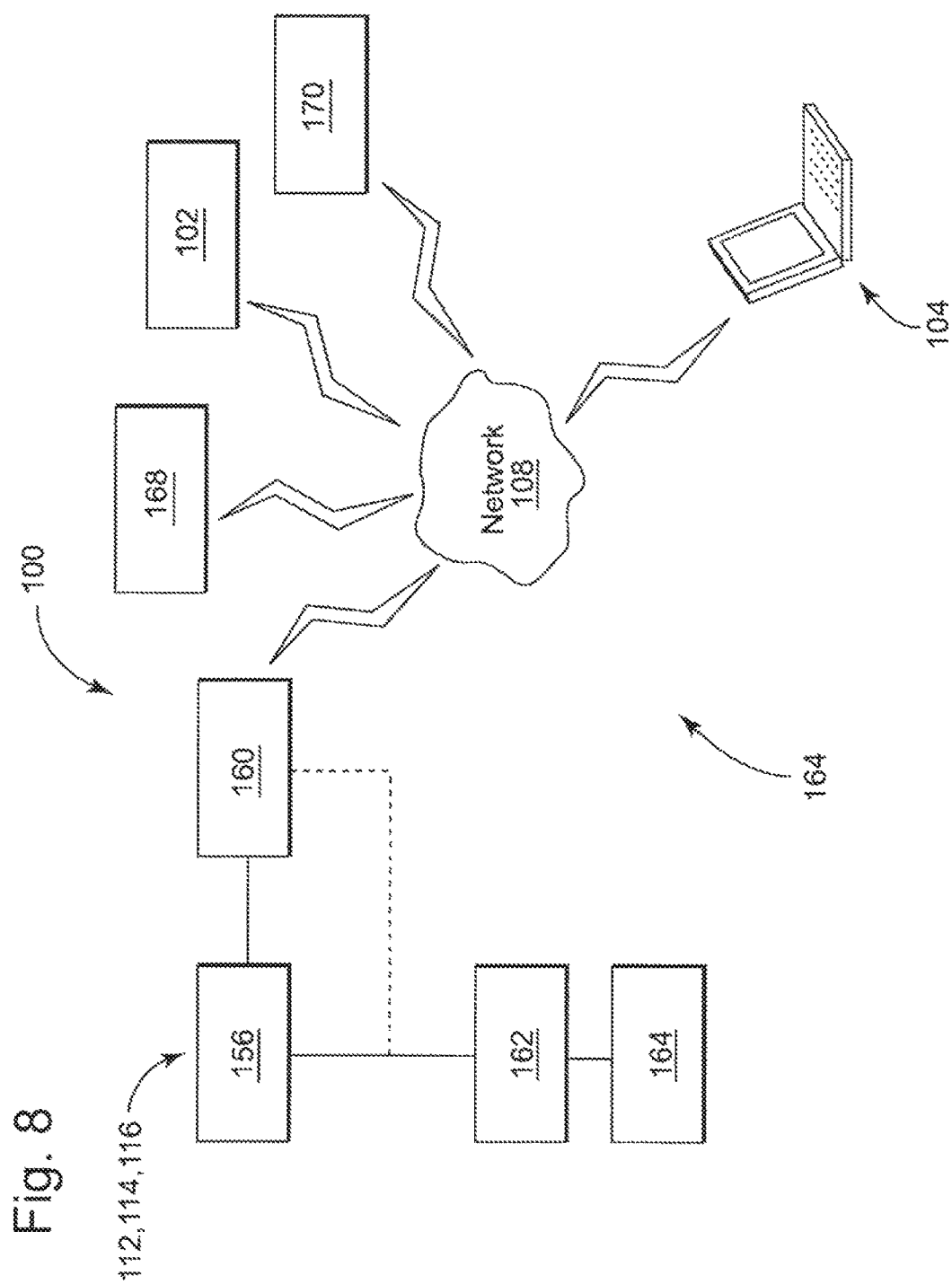

UTILIZING AN IMAGE OF A VALVE ASSEMBLY TO IDENTIFY THE VALVE ASSEMBLY FOUND ON A PROCESS LINE

CROSS-REFERENCE TO RELATED APPLICATIONS

This application is a continuation of U.S. application Ser. No. 14/641,907, filed on Mar. 9, 2015, and entitled "UTILIZING AN IMAGE OF A VALVE ASSEMBLY TO IDENTIFY THE VALVE ASSEMBLY FOUND ON A PROCESS LINE," the content of which is incorporated by reference herein in its entirety.

BACKGROUND

The subject matter disclosed herein relates to industrial process technology with particular discussion about systems and methods to identify assets on a process line using images of the assets in lieu of asset tags and/or other identifiers physically attached to the assets.

Industrial processes typically involve chemical, physical, electrical, and mechanical stages to manufacture items. The stages may utilize one or more process lines with devices that control certain aspects of the process. For process lines that carry fluids and/or transitory materials, the devices can embody flow controls that regulate a flow of the material.

A common type of flow control is a valve assembly or "control valve." This valve assembly can include an electrical or pneumatic actuator that couples with a closure member (via a stem). The closure member may embody a plug, a ball, a butterfly valve, and/or like implement that can contact the seat to prevent flow. In pneumatic configurations, the valve assembly can include a control device, also called a valve positioner, which can regulate a flow of instrument gas into the actuator. The instrument gas can pressurize (and de-pressurize) the actuator in order to locate the closure member in position relative to the seat. During operation, the valve positioner can receive and process a control signal from a controller that is part of a process control system (also "distributed control system" or "DCS system"). The control signal can define operating parameters for the valve assembly in accordance with an appropriate flow of fluid from the valve assembly and into the process line. The valve positioner can use these operating parameters and the output from the position sensor to set the position desired for the closure member.

Installations in heavy industries like chemical manufacturing and resource recovery and refining are typically built to very large scale. These installations may use hundreds and even thousands of valve assemblies. In such installations, it is often necessary to periodically perform tasks to verify operation of the valve assemblies or, in worst cases, to remediate problems that result from errors and/or failures of a particular valve assembly or group of valve assemblies.

These tasks typically require personnel to find and identify valve assemblies on the process line. To facilitate identification, each valve assembly can include identifying information, typically an identifier or "asset tag" (like a metal plate) that attaches to the valve assembly. This identifier typically has human readable information (e.g., text) and machine readable information (e.g., bar codes) that distinguishes the valve assembly from the others. In practice, personnel may carry hardware (e.g., a scanner) that can read the machine readable information on the identifier. This practice can extract information stored in the identifier. Often, the information corresponds to information found on a construction diagram (also known as a "piping and installation diagram" or "P&ID diagram") that defines the layout of the process lines. Use of this hardware and these diagrams can guide personnel to the appropriate locations to find the valve assembly of interest and confirm that the valve assembly is the correct device on which to perform maintenance.

Nonetheless, this process does not ensure that the identified valve assembly can carry the correct asset tag or other identifying feature. In order to use asset tags, for example, personnel may physically secure the asset tags (alone, or in combination with another identifier) to the valve assembly at the time of inventory, maintenance, and commissioning of the valve assembly on the process line. This process can introduce human error. It is possible, for example, for an asset tag to be mistakenly secured to the wrong valve assembly. In heavy industries, such errors can waste personnel time and effort, and can increase labor costs, because the shear size and scale of the installations can frustrate efforts to find and identify individual valve assemblies.

Moreover, it is common for the valve assembly to be located in areas that frustrate access for personnel to perform any visual recognition. These areas may require the personnel to climb, crawl, or otherwise physically scale obstacles to get into proximity of the subject valve assembly. When the process line and/or installation, generally, runs processes at extremely high temperatures or using caustic and dangerous materials, the requirement for physical proximity can place the personnel in danger.

SUMMARY

In one embodiment, a method for conveying an identity of a valve assembly on a process line, said method including receiving a first image of a subject valve assembly at a first computing device; using the first image, selecting an entry in an asset database, the entry associating valve identifying data that relates to the subject valve assembly, the valve identifying data configured to define an identity for the subject valve assembly; retrieving data from the selected entry; and generating an output for display on a second computing device, wherein the output is configured to convey the valve identifying data that relates to the subject valve assembly in the first image.

The method may further include comparing the first image with a second image that is stored in the asset database, wherein the entry associates the valve identifying data with the second image of the subject valve assembly The method may further include wherein the selected entry reflects a match that relates content in the first image with content in the second image.

The method may further include identifying a first feature of interest and a second feature of interest, one each defining a first subset of the content in the first image and a second subset of content in the second image, respectively; and comparing the first feature of interest and the second feature of interest, wherein the match relates the first subset of the content of the first feature of interest with the second subset of the content of the second feature of interest.

The method may further include wherein each of the first subset of the content of the first feature of interest and the second subset of the content of the second feature of interest comprises background structure proximate the subject valve assembly in the first image and the second image.

The method may further include comparing first metadata describing the first subset of content of the first feature of interest to second metadata in the asset database describing the second subset of content of the second feature of interest, wherein the match relates the first metadata with the second metadata.

The method may further include extracting first image data from a data package, the first image data defining the content of the first image, wherein the data package includes the first image data and device data that identifies a location for the subject valve assembly.

The method may further include comparing the first image data to second image data defining the content of the second image in the asset database.

The method may further include determining the match; creating a new entry in the asset database in response to an absence of the match, the new entry corresponding to the subject valve assembly of the first image; and writing data into the database at the new entry, the data including the first image data and one or more pieces of device data as the valve identifying data.

The method may further include wherein the identity distinguishes the subject valve assembly from another valve assembly on a process line.

The method may further include wherein the output comprises diagnostic data that relates to operation of the device.

In another embodiment a system including a first computing device including a processor with access to memory having first executable instructions stored thereon, the first executable instructions including one or more instructions for, receiving a first image of a subject valve assembly; comparing the first image to a second image of the subject valve assembly that is stored in an asset database, the entry associating the second image of the subject valve assembly to valve identifying data that relates to the subject valve assembly and configured to define an identity for the subject valve assembly; selecting an entry in the asset database, the selected entry reflecting a match that relates content in the first image with content in the second image; retrieving the valve identifying data from the selected entry; and generating a first output including the valve identifying data for display.

The system may further include a second computing device including a processor with access to memory having second executable instructions stored thereon, the second executable instructions including one or more instructions for, configuring a display in response to the first output, the display configured to display the identity of the subject valve assembly.

The system may further include wherein the second executable instructions comprise one or more instruction for, generating a first user interface that configures the display on the second computing device to capture the first image; generating a second user interface that configures the display on the second computing device to receive device data that relates to the subject valve assembly; and generating a second output that includes data that relates to the first image for transmission over a network for use on the first computing device.

The system may further include wherein the second executable instructions comprise one or more instructions for, generating a third user interface on the display that conveys the valve identifying data.

The system may further include wherein the third user interface is configured to display diagnostic data that relates to operation of the device.

The system may further include wherein the second executable instructions including one or more instructions for, determining the match; creating a new entry in the asset database in response to an absence of the match, the new entry corresponding to the subject valve assembly of the first image; and writing data into the asset database at the new entry, the data including the first image data and one or more pieces of device data as the valve identifying data In yet another embodiment, a database system for identifying valve assemblies on a process line, said database system including a first data structure including one or more entries, each of the one or more entries including a previously-acquired image of a subject valve assembly and valve identifying data that is configured to define an identity for the subject valve assembly.

The database system may further include wherein each of the one or more entries comprise metadata that defines content of the previously-acquired image.

The database system may further include wherein the metadata defines a subset of content of the previously-acquired image.

The database system may further include wherein the subset of the content of the previously-acquired image comprises background structure proximate the subject valve assembly in the previously-acquired image.

The embodiments contemplated herein may be configured to offer at least certain capabilities. These capabilities enable data transfer across a network. This data can help identify a subject valve assembly that is found in an image. The capabilities also enable data population into a database with entries that include a previously-acquired image of the subject valve assembly and certain device identifying data.

BRIEF DESCRIPTION OF THE DRAWINGS

Reference is now made briefly to the accompanying drawings, in which:

FIG. 8 depicts a schematic diagram of an exemplary embodiment of the system of FIG. 1 as part of a process control system.

Figure 1:
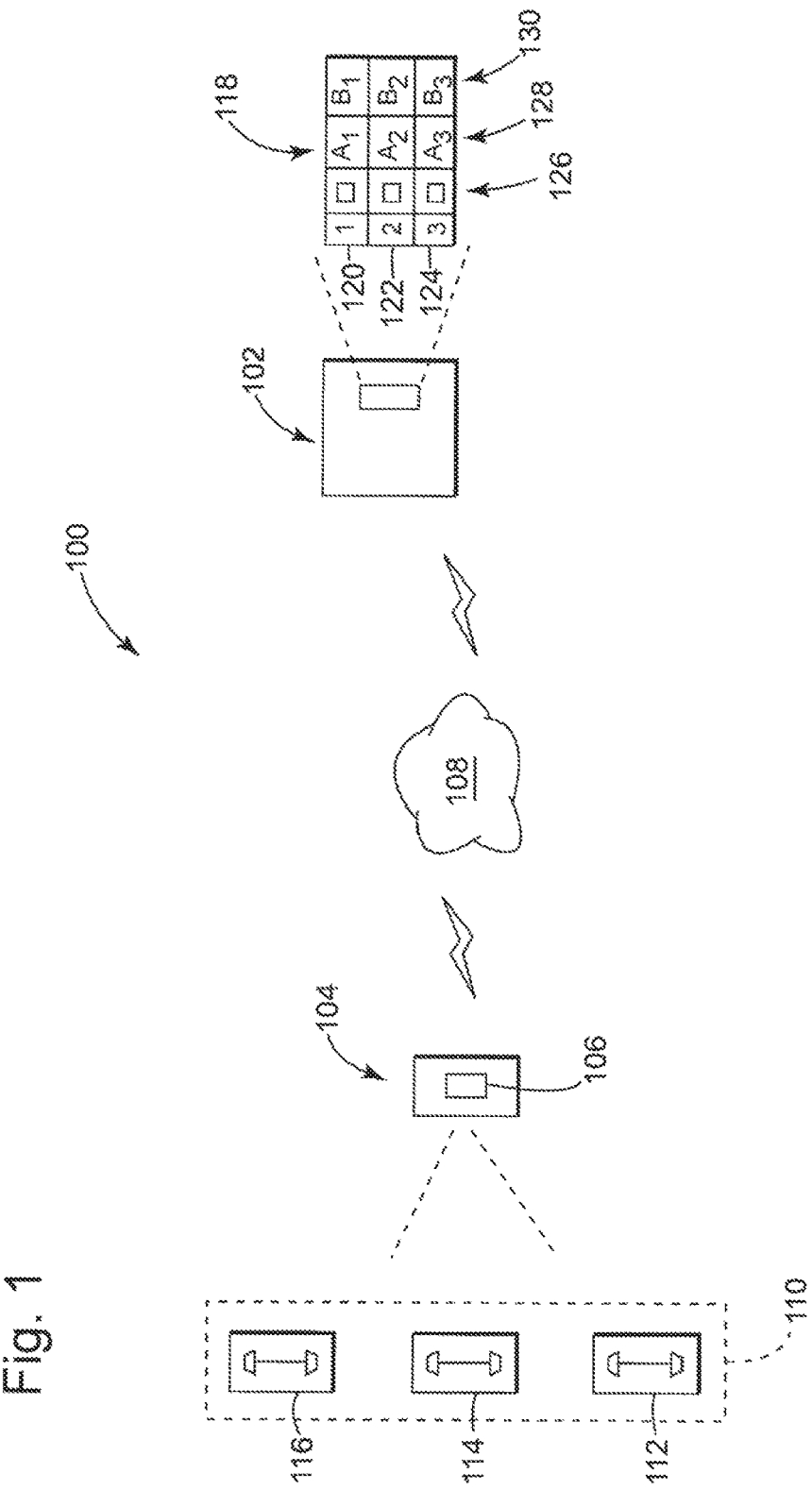
FIG. 1 depicts a schematic diagram of an exemplary embodiment of a system that can convey information to an end user that identifies a subject valve assembly using an image of the valve assembly in lieu of an asset tag or like identifier.

Where applicable like reference characters designate identical or corresponding components and units throughout the several views, which are not to scale unless otherwise indicated. Moreover, the embodiments disclosed herein may include elements that appear in one or more of the several views or in combinations of the several views.

DETAILED DESCRIPTION

Embodiments of the disclosed subject matter can provide techniques that eliminate the need to use asset tags to identify devices on a process line and/or at an installation. At least some of the embodiments below, for example, can use an image (e.g., a digital image) of a valve assembly taken by an end user in the field (e.g., on a smartphone) to formulate an identity for the device and to transmit data that relates to the identity to the end user. In this way, the embodiments can forgo use of the asset tag in lieu of other features pertinent to the valve assembly that is the subject of identification. Other embodiments are within the scope of the disclosed subject matter.

FIG. 1 illustrates a schematic diagram of a system 100 that can convey information to allow an end user to identify a valve assembly without an asset tag or like identifier. The system 100 can be deployed across one or more installations. Often, the system 100 can integrate with existing data management systems that cooperate with the DCS system. These data management systems, for example, may be in place to perform diagnostics on the process devices that are on site at the installation.

As shown in FIG. 1, the exemplary system 100 includes a first computing device 102 (also "server 102") and a second computing device 104 (also, "an image capture terminal 104" or "terminal 104") that can generate an image 106. The devices 102, 104 can communicate with one another over a network 108 using conventional wired and/or wireless protocols. On the left side of the diagram, the image capture terminal 104 is shown in proximity to a process line 110 with one or more valve assemblies (e.g., a first valve assembly 112, a second valve assembly 114, and a third valve assembly 116). The position of the image capture terminal 104 is consistent with transport by the end user (e.g., maintenance personnel) within a factory, plant, or similar installation. On the right side of the diagram, the server 102 includes a database system with an asset database 118 that comprises data and information (also, "valve identifying data,") relevant to the valve assemblies 112, 114, 116. The asset database 118 can have a data structure that includes one or more entries (e.g., a first entry 120, a second entry 122, and a third entry 124) that arrange the valve identifying data to correspond with particular devices and like assets found on the process line 110. Each entry 120, 122, 124 can associate a previously-acquired image 126 with valve identifying data (e.g., first identifying data 128 and second identifying data 130). The valve identifying data 128, 130 are configured to define an identity for the valve assembly in the image 106. In context of the present example, the entries 120, 122, 124 correspond with the valve assemblies 112, 114, 116 on the process line 118. More general implementations will populate the entries in the asset database 118 with information about devices and assets across one or more process lines or installations, or also under control, operation, or ownership of the plant owner and/or operator.

The system 100 can be configured to convey data that relates to the valve assemblies 112, 114, 116 between the server 102 and the terminal 104. For each valve assembly 112, 114, 116, the system 100 can populate an entry in the asset database 118. This feature can be useful to inventory each of the valve assemblies 112, 114, 116 either at initial installation of the process line 108 or as commissioned for use thereafter. Once the valve assembly 112, 114, 116 is populated into the asset database 118, the system 100 can provide information to the end user that identifies the valve assemblies 112, 114, 116 in the field. However, the system 100 uses the image 106 of the subject valve assembly, rather than asset tags and like identifiers that are secured or found thereon. This feature is beneficial because it can eliminate potential errors in identification should the subject valve assembly be mis-identified or mis-labeled with the wrong asset tag. The embodiments disclosed herein can also foreclose the need for an end user to be in close proximity to the subject valve assembly, but rather merely can rely on appropriate line-of-sight for the terminal 104 to capture the image 106 of the subject valve assembly.

The valve identifying data can include an assortment of data that is useful to ascribe the identity for the corresponding valve assembly 112, 114, 116 of the entry 120, 122, 124. For example, the identifying data 128, 130 can embody data and information that is useful to distinguish one valve assembly from another valve assembly. Such data may include chronology data (e.g., date/time stamps, data of commissioning, data of installation, etc.), manufacturing data (e.g., manufacturer name, manufacturer serial number(s), manufacturer location(s), etc.), installation data (e.g., location and/or GPS coordinates, process information, etc.). The visual representation 126 is preferably an image, image file, or image data associated therewith of the corresponding valve assembly 110, 112, 114 (also "a previously-acquired image 126"). In one implementation, the identifying data 128, 130 may also include metadata that is associated with the previously-acquired image 126. This metadata may describe certain features found in the previously-acquired image 126 that are useful to match the image 106 with the previously-acquired image 126. During operation of the system 100, the server 102 may be configured to identify and/or define metadata for certain features in the image 106 and compare this metadata to the metadata in the asset database 118 to select the appropriate entry 120, 122, 124.

Figure 2:
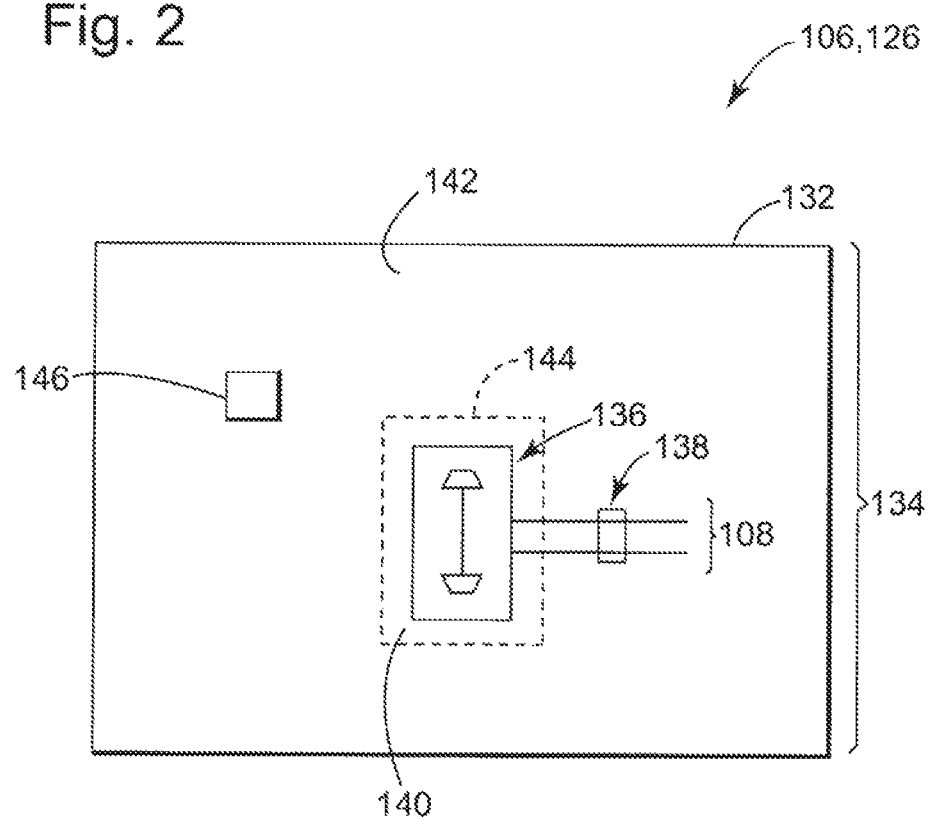
FIG. 2 depicts a schematic diagram of an example of an image for use in the system of FIG. 1.

FIG. 2 illustrates, schematically, an example of the images 106, 126. This example has a field of view 132 with an image capture area 134 that defines the extent of structure shown in the image 106, 126. This structure may include a subject valve assembly 136 and background structure 138 that includes parts of the process line 108 and other items that are disposed in proximity to the subject valve assembly 136 at the time the end user captures the image 106, 126. As also shown in FIG. 2, the image capture area 134 includes a first image capture area 140 and a second image capture area 142 delineated from one another by a boundary 144. The image capture area 134 also has a feature of interest 146, which is shown in the second image capture area 142 of the image 106, 126. The feature of interest 146 defines a subset of the content in the image 106. In one implementation, metadata may be used and/or assigned to define the subset of content, as desired. The first image capture area 140 includes structure of the subject valve assembly 136 as circumscribed by the boundary 144. The second image capture area 142 includes the background structure 138 that lends context to help formulate the identity of the subject valve assembly 136 as relates to the identity of the valve assembly 112, 114, 116 as noted in the present disclosure.

The background structure 138 can include elements that are consistent with (or in proximity of) the location of the subject valve assembly 136 on the process line 108. These elements may comprise parts of the process line 108. In one implementation, the elements of the background structure 138 can include signage, equipment, and other physical members found at the location and that can fit into the field of view 132 of the image 106, 126. The background structure 138 in the images 106, 126 may be helpful because the structure of the valve assemblies 112, 114, 116 is often identical or similar and, thus, is unlikely to provide any reasonable basis for distinguishing between the valve assemblies 112, 114, 116. On the other hand, the background structure 138 can provide additional context within the images 106, 126 for purposes of identifying the subject valve assembly 136 in lieu of any asset tags and/or other physical identifiers found, if at all, on the subject valve assembly 136.

Figure 3:
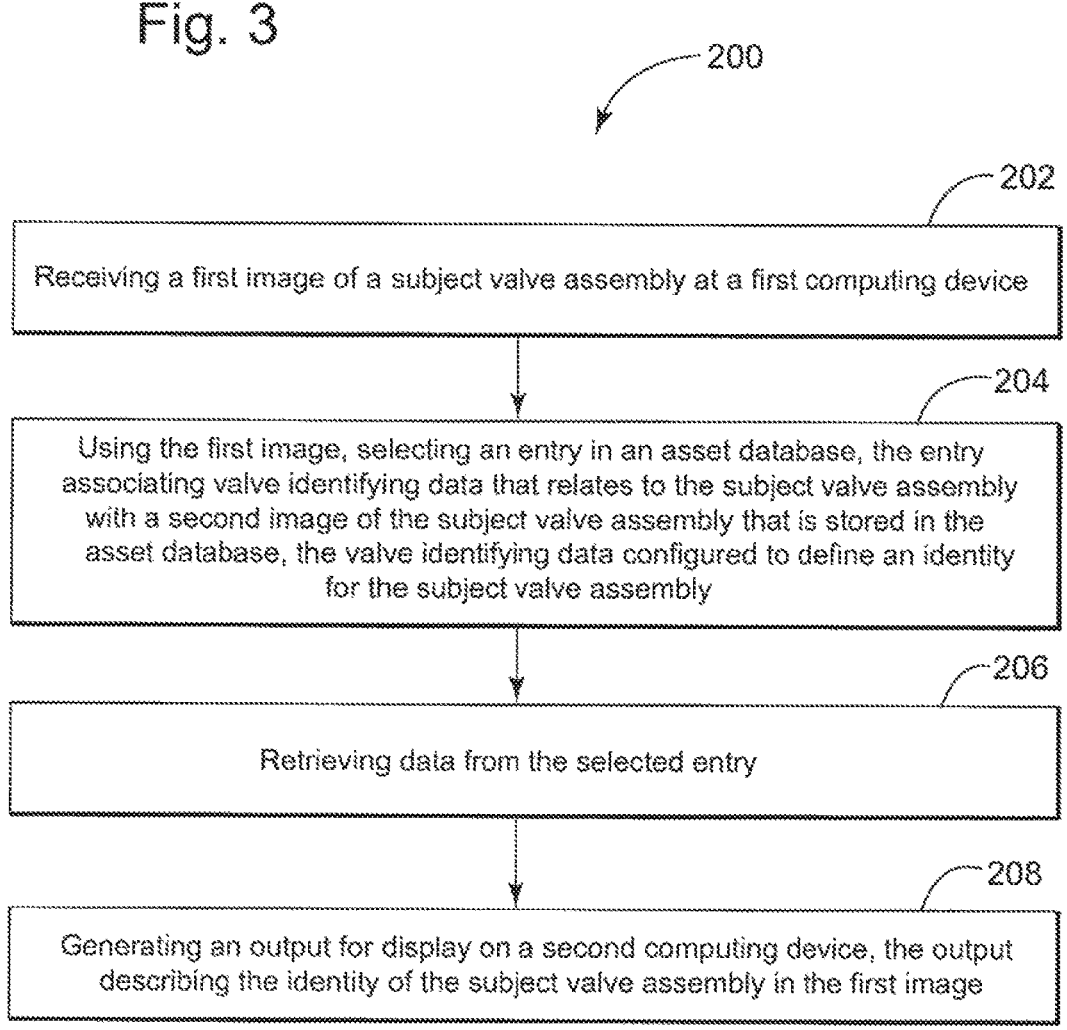
FIG. 3 depicts a flow diagram of an exemplary embodiment of method to convey device identifying data to the end user using an image of a subject valve assembly.
Figure 4:
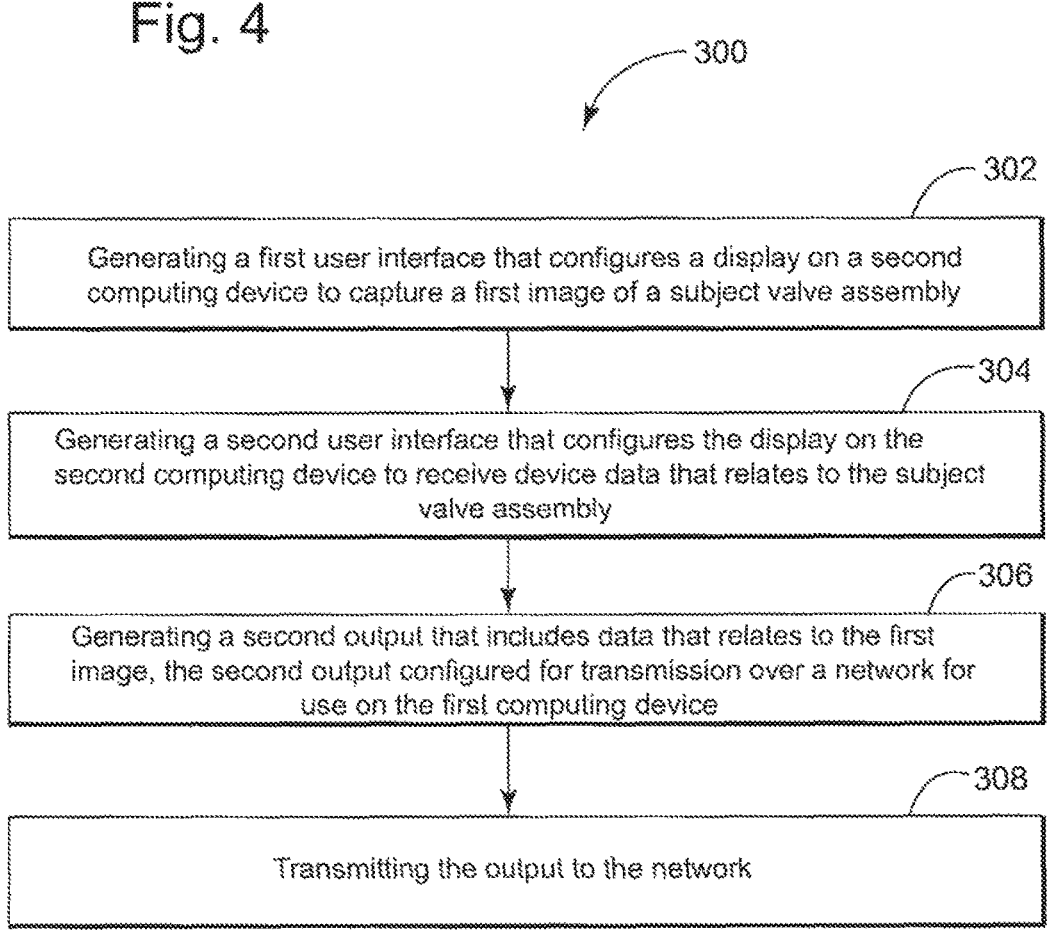
FIG. 4 depicts a flow diagram of an exemplary embodiment of method to obtain, package, and transmit an image of a valve assembly over a network for use to identify the valve assembly.
Figure 5:
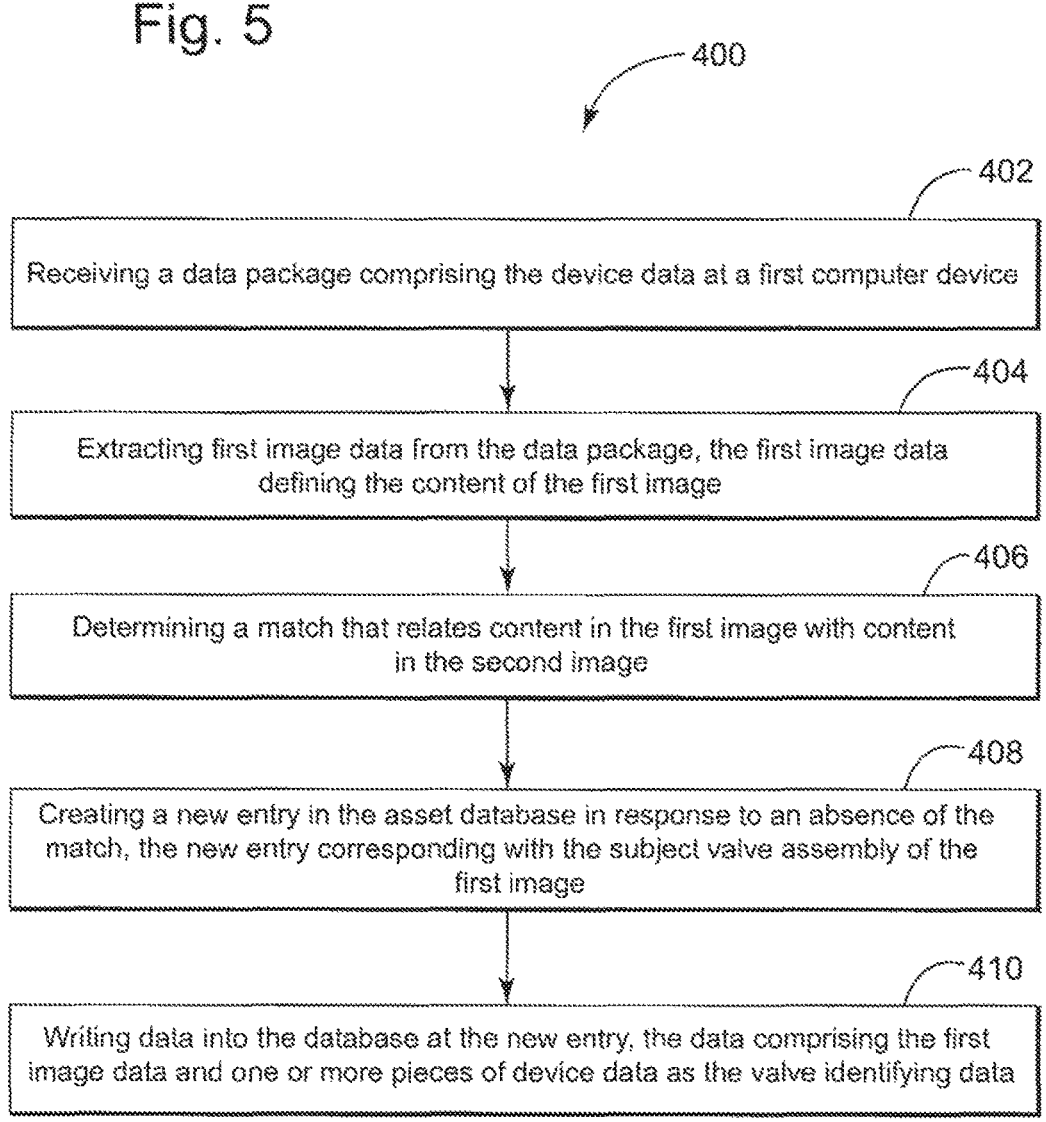
FIG. 5 depicts a flow diagram of an exemplary embodiment of method to process a data package to obtain relevant device identifying data that corresponds with a subject valve assembly and, where necessary, to populate an entry in a database with the device identifying data.
Figure 6:
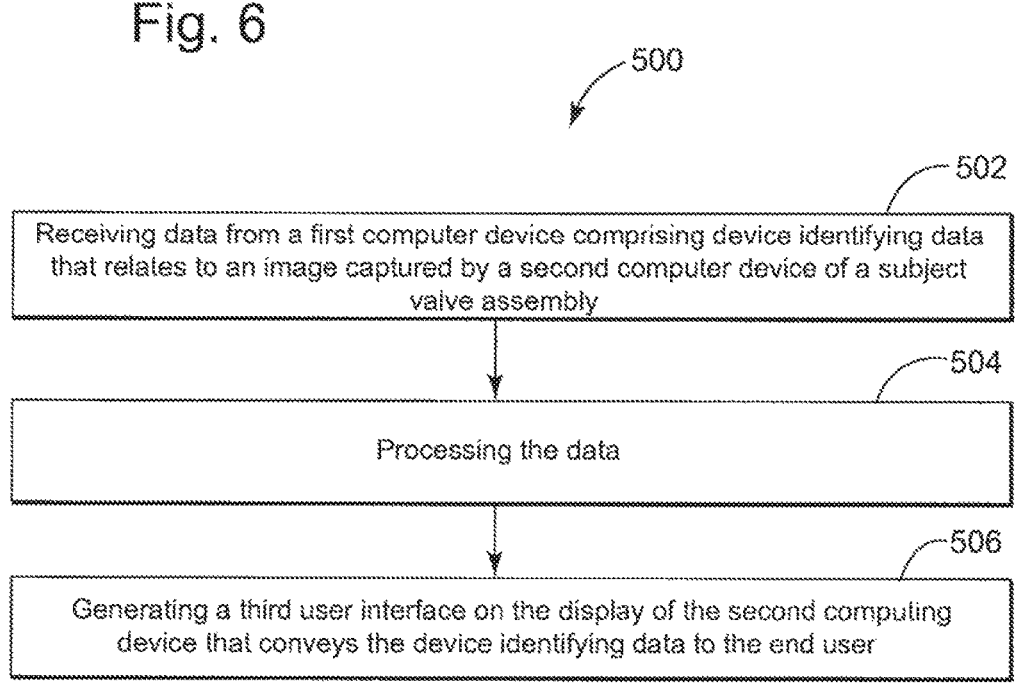
FIG. 6 depicts a flow diagram of an exemplary embodiment of method to display data about a subject valve assembly on a display of a computing device.

FIGS. 3, 4, 5, and 6 disclose various exemplary methods to, for example, configure and/or implement the system 100 to populate the asset database 118 and to exchange data about the valve assemblies 112, 114, 116 using the images 106, 126. The embodiments enable one or more of the server 102 and the terminal 104 to process and to exchange data with one another. FIG. 3 illustrates an exemplary method that configures the system 100 to render the identity of the subject valve assembly 136. This method avoids physical or human intervention to recognize and identify the subject valve assembly 136. FIGS. 4 and 5 depict exemplary methods that configure the system 100 to capture the image of the subject valve assembly 136 and, where necessary, to populate an entry in the asset database 118 with information about the subject valve assembly 136. FIG. 6 depicts a method to display data consistent with the identity on the terminal 104.

The methods shown in FIGS. 3, 4, 5, and 6 are exemplary only and not limiting. For example, the methods may be altered by, for example, having stages added, removed, or rearranged.

With reference also to FIGS. 1 and 2, FIG. 3 illustrates a flow diagram of a method 200 to convey valve identifying data for display on the terminal 104. The valve identifying data may provide the identity, e.g., by serial number, or can help the end user to formulate the identity of the subject valve assembly 136. When implemented as part of the system 100 (FIG. 1), the stages of the method 200 may be implemented as first executable instructions that configure the server 102 to perform certain processes to facilitate these functions.

The method 200 can include, at stage 202, receiving a first image 106 of the subject valve assembly 136 at a first computing device 102 and, at stage 204, using the first image 106, selecting an entry in an asset database 118, the entry associating valve identifying data that relates to the subject valve assembly 136 with a second image 126 of the subject valve assembly 136 that is stored in the asset database 118. In one example, the valve identifying data is configured to define an identity for the subject valve assembly 136. The method 200 can also include at stage 206, retrieving data from the selected entry, and, at stage 208, generating an output for display on a second computing device 104 at stage 208. The output can be configured to describe the identity of the subject valve assembly 136 in the first image 106.

At stage 202, the server 102 can receive the first image 106 from the terminal 104. Examples of the terminal 104 can embody portable devices that are configured to capture and transmit a digital image (also "digital representation"). These devices can include smartphones and tablets, although appropriately equipped cameras and computing devices (e.g., laptops, desktops, etc.) may also provide suitable functionality. In use, the end user can position the terminal 104 to capture at least part, if not all, of the valve assembly 112, 114, 116 that is the subject of identification (i.e., the subject valve assembly 136). The position of the terminal 104 may, for example, locate the terminal 104 in front or at least in relative proximity to the subject valve assembly 136. However, as noted above, such position is restricted only by operating functions (e.g., focus) that might limit the ability of the terminal 104 to capture the image 106.

At stage 204, the server 102 can use the image 106 and the previously-acquired image 126 to select an entry from the asset database 118. The selected entry can provide data that is useful to identify the subject valve assembly 136. In one embodiment, the method 200 may include stages for comparing the images 106, 126, wherein the selected entry reflects a match that relates content in the first image 106 with content in the second image 126. A failure to find the match may prompt the server 102 to add a new entry into the asset database 118, as noted further below in connection with FIG. 5.

The method 200 may include stages for processing one or more of the images 106, 126 to identify content and/or feature(s) of interest 144 that are useful to establish the match. These stages may use computer vision technology to process and/or examine the content of the images 106, 126 to identify the feature(s) of interest 144. The method 200 may then leverage the output of the computer vision technology to identify the selected entry in accordance with the concepts herein.

In one implementation, the method 200 may include stages for identifying a first feature of interest and a second feature of interest, one each defining a first subset of the content in the first image 106 and a second subset of the content in the second image 126, respectively. The method 200 may also include stages for comparing the first feature of interest and the second feature of interest, wherein the match relates the first subset with the second subset. As noted above, in certain cases, the first subset and the second subset may comprise background structure 138 proximate the subject valve assembly 136.

The stages of the method 200 may also include stages for assigning metadata describing the content and/or feature(s) of interest 144 of one or both of the image 106 and the previously-acquired image 126. These stages may result in first metadata describing the first subset of content in the first image 106 and second metadata describing the second subset of content in the second image 126. In use, the second metadata may be previously-stored in the asset database 118. This feature may facilitate more efficient operation of the processes by avoiding repetitive processing of the previously-acquired image 126 in its entirety each time the image 106 is received for identification. In one implementation, the method 200 may include stages for comparing the first metadata with the second metadata in the asset database 118, wherein the match relates the first metadata with the second metadata.

The stages of the method 200 may further include stages for extracting image data from a data package. The image data can define the content of the image 106, 126 as discuss herein and, particularly, in connection with FIG. 2 above. Examples of the data package may be received from the terminal 104, preferably in a data format that facilitates transfer of data over the network 108. The data package can include first image data and device data that, in one example, identify a location for the subject valve assembly 136. The method 200 may also include stages for comparing the first image data to the second image data in the asset database 118 as at least one way to identify the match.

At stage 206, the server 102 can retrieve data from the selected entry (the "retrieved data"). This retrieved data may represent all or a subset of the valve identifying data 128, 130 that is stored in the database 118. The method 200 may include stages for selecting one or more pieces of the valve identifying data 128, 130 based on, for example, certain operating instructions received from the terminal 104. In one implementation, the retrieved data may also include diagnostic data that defines historical and/or contemporaneous operation of the subject valve assembly 136. This diagnostic data can include performance indicators, e.g., friction, spring range, lag, stick-slip, and like parameters that can, in one example, be mathematically calculated from the operating variables discussed herein.

At stage 208, the server 102 can generate the output and/or data package with data for display on the terminal 104. This data package can be formatted to allow the retrieved data to transmit over the network 108. In this respect, the disclosed subject matter contemplates that the system 100 may utilize a client-server model to facilitate data exchange between the server 102 and the terminal 104. This client-server model may, for example, employ a web browser and a web server to generate a user interface on the terminal 104. The server 102 can operate as the web server, wherein the output is configured as one or more Web pages (or like displayable content) one the web browser. In one implementation, the method 200 can include one or more stages for formatting the output. An example of such formatting can use language-independent specifications like JavaScript Object Notation (JSON) format, which can simplify the exchange of data in connection with certain structure and architectures like the representational state transfer ("REST") structure that can use HTTP requests to perform various communication operations that create data, update data, read data, and delete data. This structure can offer a lightweight alternative to Remote Procedure Calls and Web Services (e.g., SOAP, WSDL, etc.), among other architectures that are used by conventional data exchange techniques, particularly with respect to diagnostic data from, or about, valve assemblies found on a process line. This lightweight structure can simplify the calls and data requests and outputs that are generated in response to the calls. Device diagnostics and related data management for valve assemblies can benefit from this structure because the HTTP requests significantly reduce the coding and other tasks necessary to implement the REST structure for use with diagnostic data.

With continued reference also to FIGS. 1 and 2, FIG. 4 shows a flow diagram of a method 300 that can configure the terminal 104 to generate and exchange data (also, "device data") with the server 102. The device data may be used to populate the device identifying data 128, 130 in the entries of the asset database 118. When implemented as part of the system 100 (FIG. 1), the stages of the method 300 may be implemented as second executable instructions that configure the terminal 104 to perform certain processes to facilitate these features. In one implementation, one or more of the second executable instructions may reside on the terminal 104 as a native application (or "app") to provide the user interface; although this disclosure does contemplate that some, or all, of the second executable instruction may reside remote from the terminal 104. In another implementation, the second executable instructions may configure the sever 102 and/or terminal 104 to provide the user interface as part of a web browser.

The method 300 can include, at stage 302, generating a first user interface that configures a display on a second computing device 104 to capture a first image 106 of a subject valve assembly 136. The method 300 may also include, at stage 304, generating a second user interface that configures the display on the second computing device 104 to receive device data that relates to the subject valve assembly 136. The method 300 can further include, at stage 306, generating a second output that includes data that relates to the first image 106, the second output configured for transmission over a network 108 for use on the first computing device 102. In one embodiment, the method 300 can also include, at stage 308, transmitting the output to the network 108.

At stage 302, the terminal 104 can capture the image 106. The first user interface may provide a variety of tools for the end user to operate a camera (or like configured device) found on the terminal 104. Subsequent to capture of the image, at stage 304, the terminal 104 can receive data, for example, from direct and/or manual entry by the end user. The second user interface may configure the display with one or more screens that allow manual entry, e.g., via keyboard and/or selectable icons, of information by the end user that is associated with the image 106 and the subject valve assembly 136 pictured therein. The information may describe the subject valve assembly 136 including its location, physical and/or operable conditions at the time the end user captures the image 106, and the like. In one implementation, the method 300 may include stages that configure the terminal 104 to also associate the image 106 with GPS information, time/date information, and other information that is readily accessible on and/or by the terminal 104 and that can add context to the image 106. At stages 306 and 308, the terminal 104 can generate the output and/or data package with the device data and transmit the output for use at the sever 102. The device data can include the image 106 as well as the device data that is captured and processed at the screens of the second user interface.

With reference also to FIGS. 1 and 4, FIG. 5 depicts a flow diagram of a method 400 that can configure the server 102 to populate the entries in the asset database 118 with the device data found in the package from the terminal 104. As noted above, the server 102 may be required to write data to the asset database 102 should no match between the first image 106 and the second image 126 is found during initial processing of the first image 106. In the present example of FIG. 5, the method 400 can include, at stage 402, receiving a data package comprising device data at a first computing device. The method 400 can also include, at stage 404, extracting first image data from the data package, the first image data defining the content of the first image 106. The method 400 can further include, at stage 406, determining a match that relates content in the first image with content in the second image. A discussion of examples of the match is found above in context of FIG. 3. In one implementation, the method 400 can include, at stage 408, creating a new entry in the asset database in response to an absence of the match, the new entry corresponding with the subject valve assembly 136 of the first image 106 and, at stage 410, writing data into the asset database 118 at the new entry, the data comprising the first image data and one or more pieces of device data as the valve identifying data. The written data may describe and/or relate to the previously-acquired image 126 of the subject valve assembly 136, the metadata, and one or more pieces of device data that is provided, e.g., by the end user at the terminal 104 as discussed above.

FIG. 6 depicts a flow diagram of a method 500 that configures the terminal 104 to receive and display data about the subject valve assembly 136. The method 500 can include, at stage 502, receiving data from a first computing device 102 comprising device identifying data that relates to an image 106 captured by a second computing device of a subject valve assembly 136. The method 500 can also include, at stage 504, processing the data and, at stage 506, generating a third user interface on the display of the second computing device that conveys the device identifying data to the end user. Examples of the third user interface may be configured in a variety of ways, one or more of which may convey the identity of the subject valve assembly 136 to the end user. These configurations may also include diagnostic data in the form of trend graphs and/or other graphical representations. As noted above, the third user interface may resolve on a web browser, although other implementations may use a native app that can generate displays using technology that does not require and/or utilize web browser technology.

Figure 7:
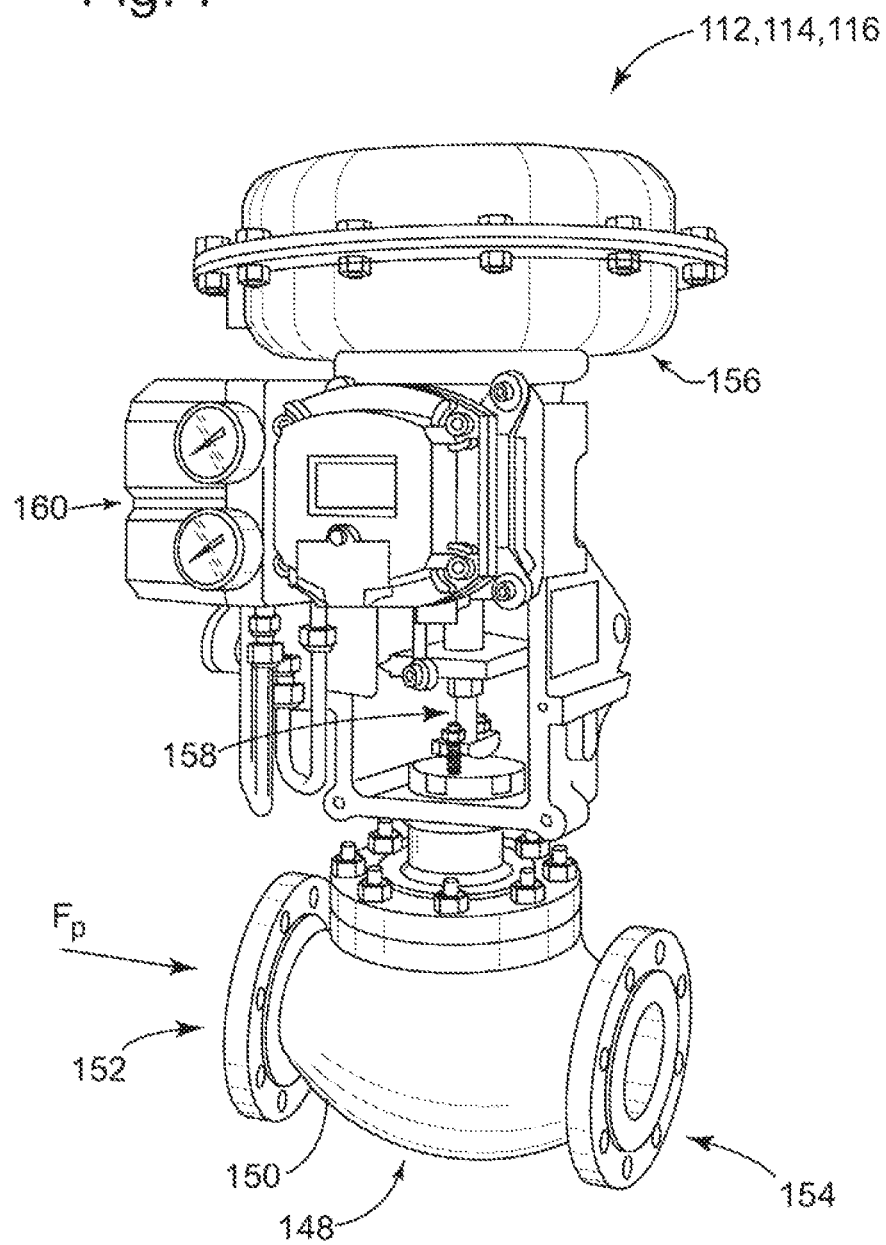
FIG. 7 depicts a perspective view of an example of a valve assembly.

FIGS. 7 and 8 depict an example of the valve assemblies 112, 114, 116 (FIG. 7) and the system 100 (FIG. 8). These examples are useful to regulate process fluids in industrial process lines typical of industries that focus on chemical production, refining production, and resource extraction. FIG. 7 provides a perspective view of the exemplary valve assembly. FIG. 8 illustrates a schematic diagram of the valve assembly 10 as part of a process control system.

In FIG. 7, the exemplary valve assembly can include a fluid coupling 148 with a body 150 that has a first inlet/outlet 152 and a second inlet/outlet 154. The exemplary valve assembly can also have an actuator 156 that couples with a valve stem 158. The exemplary valve assembly can further include a valve positioner 160 that can regulate instrument gas to the actuator 156. In this example, the valve stem 158 may extend into the body 150. Inside of the body 150 and hidden from view, the fluid coupling 148 can include components of a valve (e.g., the closure member, the seat, etc.). These components can provide structure to modulate a flow of process fluid $F_P$ between the inlet/outlets 152, 154 in accordance with operation of the actuator 156 by the valve positioner 160.

As shown in FIG. 8, the exemplary valve assembly can include a closure member 162 and a seat 164. The system 100 includes a network system 166 that includes the network 108. Examples of the network 108 can transfer data, information, and signals by way of wired protocols (e.g., 4-20 mA, FOUNDATION® Fieldbus, HART® etc.) and/or wireless protocols, many of which find use in a plant or factory automation environment. These protocols can facilitate communication over the network 108 between the server 102, the terminal 104, the valve positioner 160, a process controller 168 that operates the valve assemblies 112, 114, 116, and/or an external server 170. During operation, the process controller 168 can execute one or more computer programs to deliver a command signal to the valve positioner 160. The command signal may identify a commanded position for the closure member 162. The valve positioner 160 can use the commanded position to modulate the instrument gas to the actuator 156 and, effectively, allow the closure member 162 to move relative to the seat 164.

In view of the foregoing, the embodiments disclosed and contemplated herein can deploy features that use an image of a valve assembly to provide device identifying data that relates to the valve assembly to an end user. The embodiments can also be configured to generate an asset database that is useful to identify the device identifying data, typically generated by a image capture terminal such as a smartphone or tablet. A technical effect can be to eliminate the need to rely on physical identifiers disposed on the valve assembly and, thus, offer a more accurate modality to identify valve assemblies in the field.

Data may reside on a data source, often locally in one or more memories on the valve positioner 160 (FIG. 7), although this disclosure also contemplates configurations in which data resides across components of the system 100 (FIGS. 1 and 8). For example, a data source may integrate with the server 102 (FIGS. 1 and 8) and/or as part of the external server 170 (FIG. 8). At the data source, the data may be arranged as one or more data sets that include one or more data samples. Certain data sets may be identified by an indicator (e.g., a date stamp, a time stamp, a date/time stamp, etc.) that relates to the chronological time at which the data samples in the data set were gathered and/or stored, e.g., in memory. For real-time use of the methods, data samples may be read into a buffer and/or like configured storage medium that allows for ready access to the data samples to afford the methods with chronologically relevant data, taking into consideration necessary data processing time-lag. In one embodiment, the methods may include one or more stages for obtaining and/or retrieving the data from the data source.

The embodiments may be implemented on any device where relevant data is present and/or otherwise accessible. For example, the embodiments can be implemented as executable instructions (e.g., firmware, hardware, software, etc.) on the valve positioner. The valve positioner can transmit the output of the embodiments to a distributed control system, asset management system, independent monitoring computing device (e.g., a desktop computer, laptop computer, tablet, smartphone, mobile device, etc.). In another embodiment, the embodiments can obtain data from a historian (e.g., a repository, memory, etc.), and send to an independent diagnostic computing device. The historian can be conventionally connected to the asset management system or distributed control system. The diagnostic computing device can have all the capabilities of the monitoring computer and, in one example, the additional capability to execute executable instructions for the embodiment to process the given data. In another embodiment, the valve positioner can be configured to send data by wires or wirelessly to the diagnostic computing device, as well as through peripheral and complimentary channels (e.g., through intermediate devices such as a DCS or may be connected directly to the diagnostic computer).

One or more of the stages of the methods can be coded as one or more executable instructions (e.g., hardware, firmware, software, software programs, etc.). These executable instructions can be part of a computer-implemented method and/or program, which can be executed by a processor and/or processing device. The processor may be configured to execute these executable instructions, as well as to process inputs and to generate outputs, as set forth herein. For example, the software can run on the process device, the diagnostics server, and/or as software, application, or other aggregation of executable instructions on a separate computer, tablet, laptop, smart phone, wearable device, and like computing device. These devices can display the user interface (also, a "graphical user interface") that allows the end user to interact with the software to view and input information and data as contemplated herein.

The computing components (e.g., memory and processor) can embody hardware that incorporates with other hardware (e.g., circuitry) to form a unitary and/or monolithic unit devised to execute computer programs and/or executable instructions (e.g., in the form of firmware and software). Exemplary circuits of this type may include discrete elements such as resistors, transistors, diodes, switches, and capacitors. Examples of a processor include microprocessors and other logic devices such as field programmable gate arrays ("FPGAs") and application specific integrated circuits ("ASICs"). Memory can include volatile and nonvolatile memory and can store executable instructions in the form of and/or including software (or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

Aspects of the present disclosure may be embodied as a system, method, or computer program product. The embodiments may take the form of an entirely hardware embodiment, an entirely software embodiment (including firmware, software, etc.) or an embodiment combining software and hardware aspects that may all generally be referred to herein as a "circuit," "module" or "system." The computer program product may embody one or more non-transitory computer readable medium(s) having computer readable program code embodied thereon.

Computer program code for carrying out operations for aspects of the present invention may be written in any combination of one or more programming languages, including an object oriented programming language and conventional procedural programming languages. Program code embodied on a computer readable medium may be transmitted using any appropriate medium, including but not limited to wireless, wireline, optical fiber cable, RF, etc., or any suitable combination of the foregoing.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
at a computing device that is configured to operate as a client in a client-server network, the client having a processor with access to executable instructions for,
causing a camera on the computing device to operate in response to an input from an end user, the camera capturing an image of a subject valve assembly;
reading data into memory that corresponds with the image of the subject valve assembly;
transmitting an output with device data that defines the image;
receiving valve identifying data for the subject valve assembly subsequent to transmission of the output; and
generating a user interface in response to the valve identifying data to convey an identity of the subject valve assembly to an end user.

2. The method of claim 1, further comprising:
providing the user interface in a configuration to receive manually-entered information that describes the subject valve assembly, wherein the device data defines the manually-entered information.

3. The method of claim 1, further comprising:
associating location data for the subject valve assembly with the image, wherein the device data defines the location data.

4. The method of claim 1, further comprising:
displaying a web browser to resolve the user interface on a display.

5. A method, comprising:
at a computing device that is configured to operate as a server in a client-server network, the server comprising a processor with access to executable instructions for,
receiving captured image data that corresponds to a first image of a subject valve assembly;
accessing an asset database comprising valve identifying data including previously-captured image data corresponding with previously-captured images of valve assemblies;
comparing the captured image data to previously-captured image data stored in the asset database;
using the captured image data and the previously-captured image data, identifying content in the first image and the previously-captured images to identify an entry in the asset database; and
generating an output with data from the entry, wherein the data defines an identity for the subject valve assembly.

6. The method of claim 5, further comprising:
using the captured image data and the previously-captured image data, associating structure around the subject valve assembly in the first image and the previously-stored images to select the entry.

7. The method of claim 5, further comprising:
using the captured image data and the previously-captured image data, associating parts of a process line proximate the subject valve assembly in the first image and the previously-stored images to select the entry.

8. The method of claim 5, further comprising:
using the captured image data and the previously-captured image data, associating structure of the subject valve assembly in the first image and the previously-stored images to select the entry.

9. The method of claim 5, further comprising:
using the captured image data and the previously-captured image data, associating meta-data that describes features in the first image and the previously-stored images to select the entry.

10. The method of claim 5, further comprising:
using the captured image data and the previously-captured image data, determining a match that relates content in the first image with content in one of the previously-stored images, where in the entry corresponds with the match.

11. The method of claim 10, further comprising:
writing data into the asset database at a new entry in response to absence of the match.

12. A method, comprising:
accessing an asset database comprising valve identifying data including previously-captured image data corresponding with previously-captured images of valve assemblies;
using captured image data that corresponds with an image of a subject valve assembly to locate valve identifying data in an entry of the asset database, the valve identifying data relating to the subject valve assembly; and
generating an output with the valve identifying data in a form that identifies the subject valve assembly to an end user.

13. The method of claim 12, further comprising:
identifying a location for the subject valve assembly from the captured image data, wherein the entry corresponds with the location.

14. The method of claim 12, further comprising:
identifying background features from the captured image data, wherein the entry corresponds with the background features.

15. The method of claim 12, further comprising:
identifying metadata in the captured image data, wherein the entry corresponds with the metadata.

16. The method of claim 12, further comprising:
using the captured image data to locate diagnostic data that defines historical performance of the subject valve assembly; and
providing the diagnostic data in the output.

17. The method of claim 12, further comprising:
writing data into the asset database that comprises the captured image data and device data that relates to the image.

18. The method of claim 17, wherein the device data identifies a location for the subject valve assembly in the image.

19. The method of claim 17, wherein the device data is specific to a location at which the subject valve assembly resides in a process line.

* * * * *